Sept. 12, 1933.  F. J. BRAINARD  1,927,008
FRUIT BASKET
Original Filed July 27, 1927
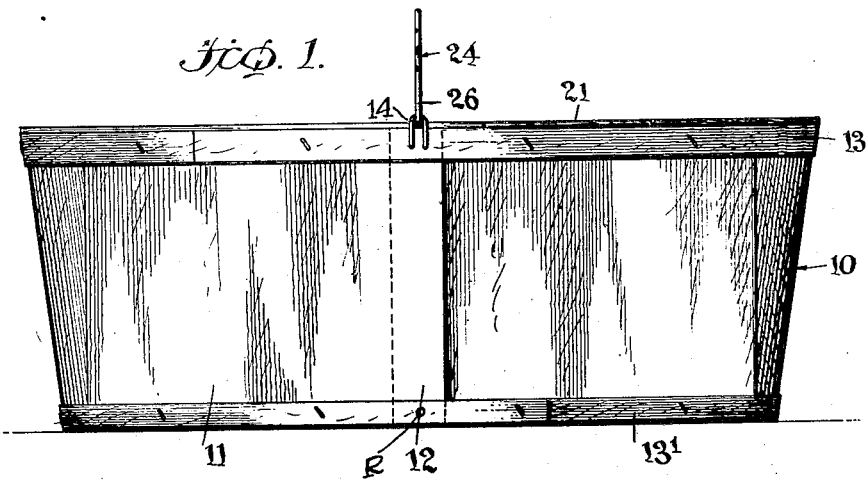
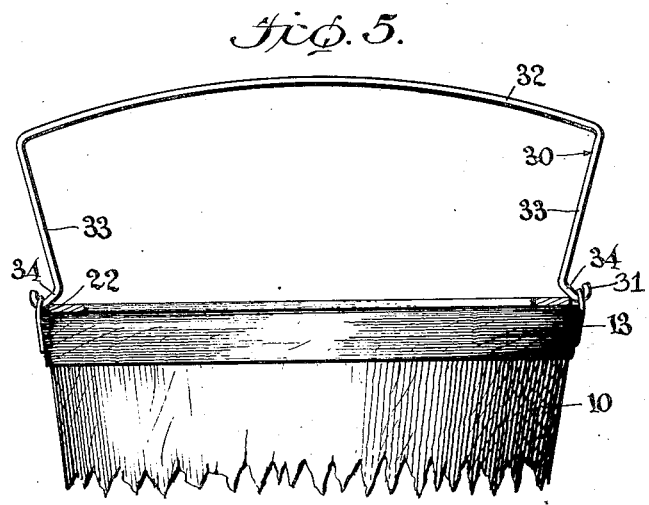
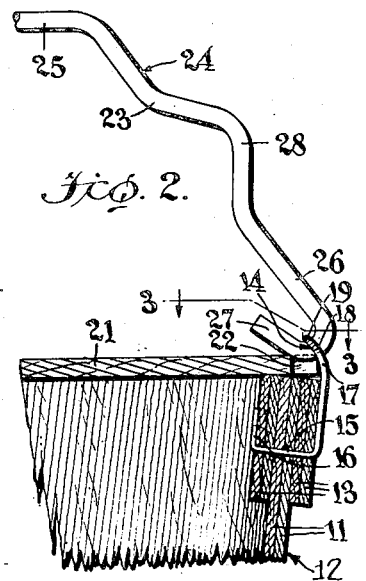
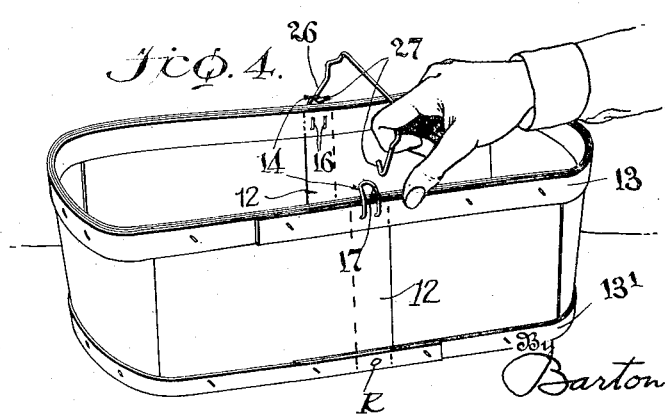
Inventor
Forest J. Brainard,
By Barton A. Bean Jr.
Attorney Patented Sept. 12, 1933

1,927,008

UNITED STATES PATENT OFFICE 1,927,008

FRUIT BASKET

Forest J. Brainard, Stockton, N. Y.

Continuation of application Serial No. 208,789, July 27, 1927. This application October 30, 1930. Serial No. 492,332

10 Claims. (Cl. 217—125)

This invention relates to containers and particularly to baskets, for packing small fruits such as grapes, and having wire bails functioning as carrying handles and means for holding basket covers in place.

Heretofore I have made certain improvements in baskets of this type as exemplified in my reissued Patent No. 17,210 granted February 12, 1929, which discloses a removable wire handle adapted to cooperate with staples or lugs formed on the basket body and with basket cover to retain the latter in position and to retain the handle in an upright position when the cover is in place, except when rotational forces are applied to the handle forcing it to or toward a position flat against the cover.

These or similar baskets are delivered to packers in nested stacks, the covers and handles being detached. In packing grapes or the like therein, individual baskets may be taken into the vineyard or field and filled, the handles attached thereto, and the filled baskets then carried on a truck to a central shed for inspection and application of the cover. During transportation of the filled baskets on such a truck, the handles, which are already applied in order to prevent spreading of the basket under the weight of the fruit and to expedite handling thereof, are folded or pivoted into the plane of the basket top so as to enable stacking of the baskets one on the other. After inspection the covers are passed through the handles and snapped downwardly thereon into position for closing the basket.

The present invention contemplates an improved basket construction of the type disclosed in my co-pending application Serial No. 208,789, filed July 27, 1927, of which this application is a continuation. This construction embodies a basket having cam lugs or staples for engaging the basket handle and for urging the handle into an upright position when the cover is removed or in place, the cover when in place also coacting with means on the handle to urge it to an upright position. The cover is provided with notches alined with the cam staples for receiving portions of the handle in order that the latter may retain the cover against longitudinal displacement and may be effectively acted upon by the cover to be raised to upright position.

The handle is provided with fins forming finger grips, which enable the handle to be readily placed upon the basket after the latter has been filled. In subsequent transportation of the basket before the application of the cover, the handle may be pulled or flexed upon the basket top by the superimposing of other baskets or the like. Upon removal of the latter, the cam ears raise the handle to an upright position in which it may be readily gripped for disengagement from the cam staple on one side of the basket to permit of placement of the cover and refastening of the handle.

These and other objects and advantages will become apparent from the following description of a typical basket construction embodying the principles of the invention, reference being made to the accompanying drawing wherein:

Fig. 1 is a side elevational view of a basket constructed in accordance with the present invention.

Fig. 2 is an enlarged fragmentary cross-sectional view showing the basket body, cover, handle, and one cam staple in assembled relationship.

Fig. 3 is a fragmentary plan sectional view of the portion of the basket shown in Fig. 2 and taken on line 3—3 of Fig. 2.

Fig. 4 is a perspective view of the basket and handle depicting the manner of gripping the handle for effecting attachment or detachment thereof; and Fig. 5 is an end view of a basket provided with a modified handle, portions of the basket cover being broken away to reveal notches formed in the sides thereof.

As shown in Fig. 1 the basket body 10 comprises thin side wall sections or slats 11, overlapping at the central side portions 12 of the basket and reinforced and secured together at the upper and lower edges thereof by bands or rims 13 and 13' respectively. The basket body thus constructed is very light and flexible so that the opposite side walls may be readily pressed inwardly or toward one another or spread outwardly by the weight of fruit or other material contained therein.

Handle receiving members 14, which may hereinafter be termed "staples" are secured to the opposite sides of the basket, preferably extending through the inner and outer upper rims 13 and the overlapped portions of the side wall sections 11. The staples may comprise substantially U-shaped wires, the sides or legs 15 of which are forced through the basket body, the terminal portions 16 and the bight or loop portions 17 thereof being bent upwardly to securely clamp the members 14 to basket. The upper ends 18 of the bights 17 are bent inwardly over the margin of the basket, the central portions 19 of these inwardly bent loops on the opposite sides of the basket being closer together than other directly opposing portions thereof.

This inward bending or camming of the handle receiving staples may be effected by an automatic stapling machine at the same time that the staples are affixed to the basket. The staples may be modified as to manner of attachment to the basket body and as to their structural formation, the essential feature being the inward sloping of the handle engaging surfaces toward the central portion 19 thereof as clearly shown in Fig. 3.

A removable basket cover 21, conforming generally in contour to the outer rim or band 13, is preferably provided with notches 22 at the opposite sides thereof, the notches being adjacent to the staples or lugs 14 when the cover is in place upon the basket body. The handle comprising bail 23, generally designated at 24, consists of a resilient wire of substantially U-shape, the bight portion 25 being straight and the end portions 26 being directed outwardly and downwardly, terminating in return bent portions 27 directed upwardly and inwardly. These bent or hooked ends are adapted to engage in the staples 14 and to bear against and extend partially into the notches of the cover 21. The end portions 26 are provided with outward bends 28 which constitute finger pieces, for aiding in the attaching and detaching of the bail.

As depicted in Fig. 4, the bail or handle may be readily attached by inserting one hook 27 into one staple, placing one finger of one hand in the finger grip 28 of the opposite end 26 and pressing the basket side inwardly to allow the hook of the unfastened end of the handle to engage the corresponding staple 14. The handle may be readily removed by gripping it in a similar manner. When the handle and cover are in place, the latter will be firmly retained against upward or lateral movement by the engagement of the handle hooks 27 therewith.

The handle is normally of less width than the basket cover and consequently presses or draws the lugs 14 against the cover sides, the inwardly bent portions 18 engaging over and preventing upward movement of the cover relative to the body 10. The hooked ends of the handle, engaged in the notches of the cover, cooperate therewith, in a manner similar to that disclosed in my Reissue Patent No. 17,210, granted February 12, 1929, to effect movement of the handle to, and retention in, an erect position as shown in Fig. 1 except when under the influence of rotating pressure, when the handle may be moved about an axis extending between the opposite staples 14 to a position flat against the cover 21.

When the cover is removed this means is not effective to retain the handle in an erect position. However, the engagement of the handle hooks with the cam lugs 14 will effect this action, at all times, when the cover is either attached or detached. The relative outward pressure of the basket sides to the handle, induced by the tensioning of the basket and handle when applying the latter and increased by the weight of any contents of the basket, will cause the basket walls and the attached staples to move slightly outwardly, this movement causing inward movement of handle hooks 27 relative to the staples, resulting in the handle moving from engagement with side portions of the bight of the staples, to the central portion 19 thereof, the latter position being depicted in Fig. 3. As the handle is rotatable about an axis passing approximately through the centers of the apertures formed by the staples, such movement of the contacting handle portion will effect or urge rotation of, or maintenance of the handle in an erect position.

It will thus be understood that when the baskets are handled before application of the covers 21 or after removal thereof, the handles will be held in an upright position in which they may readily be gripped, by the action of the cam staples 14. When the covers are in place, these means will function to assist the hooked handle ends and the notched cover in retaining the handle in erect position. The handle may be readily engaged or disengaged from the basket body, by gripping it at the bent portion 28, for placing or displacing the cover, or for packing the basket. The bent portions receive the fingers as shown in Fig. 4 and thereby serve as means for locating the zone of application of finger pressure for spreading the handle.

In Fig. 5 a modified handle 30 is depicted in which the ends are formed by an outward return bend 31 rather than an inward bend as shown in Fig. 2. The bight portion 32 of the modified handle terminates in inwardly and downwardly inclined portions 33, which in turn terminate in the hooks 31, of which the cam or cover engaging portions 34 correspond to the extreme end portions of the handle 24. In use the handle 30 will function in the same manner as the handle 24. The cover may be applied, however, without unfastening the handle as it may be inserted through the handle loop and pressed downwardly into place, in the manner disclosed in my Reissue Patent No. 17,210.

As shown in Figs. 1 and 4 rivets or staples R are placed in the bottom portion of the overlapping side walls 11 of the basket body, and below the staples or lugs 14. As shown in Fig. 1 particularly, the side wall portions overlap along this zone of the basket body, and the staples R are so positioned with respect to the staples 14 as to be in alignment with each other and in alignment with an imaginary line substantially perpendicular to the bottom of the basket. These especially located rivets R insure proper fastening of the overlapping ends of the side walls and provide for a more satisfactory structure.

It will be further understood that other changes in the structure of the baskets herein described may be made within the scope of the invention as determined by the appended claims. From the foregoing it will be observed that the side wall sections overlap at 12 and are secured together and to the bottom of the basket by such rivets or staples R in substantial alignment with the staples or lugs 14' which firmly unite the overlapped central side portions at the upper edge of the basket. Consequently when the handle 24 is engaged with the staples or lugs such overlapping central side portions 12 provide strain transmitting areas or zones from the bail carrying handle to the bottom of the basket, or to a point where the entire load of the basket is applied. Thus, there is produced in effect a combined wood and wire handle, the reinforced or overlapped portions 12 of the wooden side sections of the baskets acting conjointly with the handle 24 in transmitting the carrying strains from the bottom of the basket, and thereby relieve the remainder of the veneer-like portions of the wall from the burden transmitted from the basket bottom to the wire handle.

What is claimed is:

1. A basket comprising a body portion, handle retaining lugs secured to the body portion, and a handle extending between the lugs, said handle having a substantially horizontal top portion terminating into downwardly extending portions, each downwardly extending portion terminating in a hook adapted to pass through the adjacent lug, and downwardly extending portions being formed with a curved offset portion below said top horizontal portion and above the hooks for locating a zone for application of pressure to remove or attach the handle, said offset portion also providing bearing areas for supporting and retaining pressure applying means to the handle.

2. A basket, a cover therefor, wire staples fastened to said basket and having their bight portions projecting inwardly thereover, a substantially U-shaped carrying bail having an intermediate portion of the bail straight and in substantial parallelism with the cover, the intermediate end portions being directed divergingly outwardly and downwardly and the ultimate end portions having return bends at their extremities engaged with the bight portions of said staples, the intermediate portions of said end portions being provided with bends forming finger grips.

3. A basket construction comprising a body portion having opposed sides, handle attaching means having an anchoring part engaged with the body portion beneath the top edge thereof, said handle attaching means extending upwardly over the side of the body portion and thence inclined inwardly over the top edge thereof, said inwardly inclined portion of the attaching means having a handle receiving part with surfaces converging inwardly over the body portion and between which surfaces the hooked end of a handle is adapted to be received.

4. A basket construction comprising a body portion, substantially U-shaped wire staples secured to the opposite sides of the body portion by their legs and having their bight portions projecting above the top of the the basket sides, said projecting bight portions being bent inwardly over the top of the sides and formed with inwardly converging surfaces to receive a handle therebetween, and a handle for the basket provided with terminal portions passing through the staples between the converging surfaces of the bight portions.

5. A basket having a body portion, a reinforcing band about the upper edge of the body portion, substantially U-shaped wire staples for attaching a handle, each staple having its legs passed through the reinforcing band and body portion to secure the same together and further serve to anchor the staple, said staple extending upwardly on the outside of said band with the bight portion of the staple projecting above the band and bent thereover so as to dispose the bight portion substantially over the upper edge of the basket, and a handle having terminal portions detachably engaged in the bight portions of the staples, each bight portion having inwardly converging surfaces.

6. Basket construction comprising a bottom, sides including a lapped section, a handle secured to said lapped section, and means penetrating said lapped section securing said sides to said bottom, whereby the line of force transmission from said bottom to said handle passes through the lapped section of said sides.

7. Basket construction comprising a bottom, sides including lapped sections oppositely disposed with respect to said basket, a bail handle secured to said lapped sections, and means penetrating said lapped sections securing said sides of said bottom, whereby the line of force transmission from said bottom to said handle passes through the lapped sections of said sides.

8. Basket construction comprising a bottom, sides including lapped sections, lugs secured to said lapped sections, a bail handle pivotally mounted in said lugs, and means penetrating said lapped sections securing said sides to said bottom, whereby the line of force transmission from said bottom to said handle passes through said lapped sections.

9. Basket construction comprising a bottom, sides including a lapped section, a handle, reinforcing bands at the upper and lower edges of said sides, said handle being secured to said lapped sections through the upper reinforcing band, and means penetrating the lower reinforcing band and said lapped sections, securing said sides to said bottom, whereby the line of force transmission from said bottom to said handle passes through said lapped sections.

10. Basket construction comprising a bottom, sides including lapped sections oppositely disposed with respect to said basket, reinforcing bands at the upper and lower edges of said sides, a handle, lugs secured to said lapped sections through the upper reinforcing band, a bail handle pivotally mounted in said lugs, and means penetrating said lapped sections through the lower reinforcing band securing said sides to said bottom, whereby the line of force transmission from said bottom to said handle passes through said lapped sections.

FOREST J. BRAINARD.